United States Patent [19]

Ohta

[11] Patent Number: 5,185,668
[45] Date of Patent: Feb. 9, 1993

[54] IMAGE READING APPARATUS FOR READING IMAGES FORMED BY A LIGHT TRANSMISSION

[75] Inventor: Kenichi Ohta, Yokohama, Japan

[73] Assignee: Canon Kabushiki Kaisha, Tokyo, Japan

[21] Appl. No.: 477,513

[22] Filed: Feb. 9, 1990

[30] Foreign Application Priority Data

Feb. 10, 1989 [JP] Japan ................................. 1-30026

[51] Int. Cl.$^5$ ............................................. H04N 3/36
[52] U.S. Cl. .................................. 358/214; 358/445; 358/446; 382/58
[58] Field of Search ............... 358/214, 464, 474, 485, 358/487, 445, 497, 446, 466, 448, 451, 65, 64, 54, 70, 102, 75, 80; 250/214 L, 208.1; 382/58, 59, 8, 53; 353/26 A, 26 R

[56] References Cited

U.S. PATENT DOCUMENTS

| | | | |
|---|---|---|---|
| 3,629,495 | 12/1971 | Cahill | 358/487 |
| 3,943,559 | 3/1976 | d'Auria et al. | 358/214 |
| 4,281,351 | 7/1981 | Poetsch et al. | 358/214 |
| 4,326,217 | 4/1982 | Iwasawa et al. | 358/214 |
| 4,335,399 | 6/1982 | Matsumoto | 358/80 |
| 4,346,402 | 8/1982 | Pugsley | 358/80 |
| 4,633,306 | 12/1986 | Utsugi | 358/102 |
| 4,666,307 | 5/1987 | Matsumoto et al. | 358/163 |
| 4,674,126 | 6/1987 | Kotera | 382/53 |
| 4,700,237 | 10/1987 | Yoshioka et al. | 358/451 |
| 4,736,244 | 4/1988 | Shiota et al. | 358/80 |
| 4,762,985 | 8/1988 | Imai et al. | 250/201 |
| 4,825,065 | 4/1989 | Imai | 250/205 |
| 4,827,526 | 5/1989 | Matsumoto | 358/449 |
| 4,837,450 | 6/1989 | Satomura et al. | 250/571 |
| 4,839,739 | 6/1989 | Tachiuchi et al. | 358/466 |
| 4,841,374 | 6/1989 | Kotani et al. | 358/404 |
| 4,888,492 | 12/1989 | Arimoto | 358/448 |
| 4,891,692 | 1/1990 | Duta | 358/80 |
| 4,918,542 | 4/1990 | Nagashima et al. | 358/451 |
| 4,933,983 | 6/1990 | Hiramatsu et al. | 382/8 |
| 4,939,590 | 7/1990 | Tada | 358/451 |
| 4,974,072 | 11/1990 | Hasegawa | 358/80 |
| 4,992,863 | 2/1991 | Moriya | 358/80 |
| 5,003,381 | 3/1991 | Wagensonner | 358/75 |
| 5,038,207 | 8/1991 | Itagaki et al. | 358/75 |

FOREIGN PATENT DOCUMENTS 0149256 8/1985 Japan ................................. 358/487

Primary Examiner—Victor R. Kostak
Assistant Examiner—Jeffrey S. Murrell
Attorney, Agent, or Firm—Fitzpatrick, Cella, Harper & Scinto

[57] ABSTRACT

An illuminator for applying light to an image, a reader for photoelectrically reading the light applied image, an amplifier for amplifying an analog signal outputted from the reader, an A/D converter for converting an analog signal outputted from the amplifier into a digital signal, a logarithmic transformer for logarithmically transforming the digital signal outputted from the A/D converter, a first controller for changing the logarithmic transformation of the logarithmic transformer, and a second controller for changing the gain of the digital signal in accordance with a change of the logarithmic transformation characteristic caused by the first controller.

26 Claims, 11 Drawing Sheets

IMAGE READING APPARATUS FOR READING IMAGES FORMED BY A LIGHT TRANSMISSION

BACKGROUND OF THE INVENTION

1. Field of the Invention

The present invention relates to an image reading apparatus, and more particularly to a film reading apparatus for reading through light transmission the image printed in a silver salt film.

2. Related Background Art

It has been proposed heretofore to photoelectrically read images recorded in books, magazines and so on by using a CCD image sensor or the like to thereafter transmit the images to a remote location, electrically edit them, store them in an electronic file or the like, or perform other processings.

It has also been proposed to photoelectrically read images recorded in a film such as a 35 mm film, microfilm and so on by using a CCD image sensor or the like. The present applicant has already proposed apparatus for reading images recorded in a film, for example, as in U.S. Pat. Nos. 4,674,126, 4,700,237, 4,762,985, 4,837,450, 4,825,065, 4,933,983 and U.S. application Ser. No. 419,702 (filed on Oct. 11, 1989).

An image in a silver salt film includes the information of very broad dynamic range as compared with a reflection image of an ordinary printing matter or the like. Printing matters has the image density range of about 0 to 1.5, whereas the transmission density range of a film is about 0 to 3.0 which is about two times as broad as that of printing matters.

If an image in a film has a limited density range within the film transmission density range (0 to 3.0), it is common that the image only within the limited density range is read and converted into image signals. This is particularly the case for a negative film.

Next, a method of variably changing the density range will be described with reference to FIG. 1.

In the graph shown in FIG. 1, the first quadrant illustrates the relationship between the density of a subject to be taken with a film and the density of the image printed on the film. A curve 31 represents the film characteristic which shows that the black and white are reversed.

The second quadrant illustrates the relationship between the film density and an output value obtained by reading the image and performing A/D conversion and logarithmic transformation. A straight line 32 indicates that the film density 0 to 3.0 is reversed in reading the image.

The third quadrant illustrates how the output value after logarithmic transformation is changed to a signal having only a specific density range.

The fourth quadrant illustrates the relationship between the final image signal and the original camera subject density.

If a subject has a low contrast and flat image, the subject density range is restricted to $\Delta D_0$, whereas if a subject has a high contrast and large luminance difference, the subject density range is restricted to $\Delta D_0''$.

The subject density ranges $\Delta D_0$, $\Delta D_0'$, and $\Delta D_0''$ correspond to the film density ranges $\Delta D_f$, $\Delta D_f'$ and $\Delta D_f''$. The image of a subject is read by restricting the film density range to one of three ranges $\Delta D_f$, $\Delta D_f'$ and $\Delta D_f''$. Such change is carried out by using one of the straight lines 33, 34 and 35 shown in the third quadrant in FIG. 1.

The changed output signal is represented by one of the straight lines 36, 37 and 38 shown in the fourth quadrant.

The output after A/D conversion does not correspond to the film density D, but to the film transmittance T. The relationship between the film density D and the film transmittance T is given by the following equation (1):

$$D = -\log T \tag{1}$$

The change in image signal by using the straight line 32 in the second quadrant shown in FIG. 1 and one of the straight lines 33, 34 and 35 can be efficiently performed at the same time by using a logarithmic transformer 109 shown in FIG. 2.

FIG. 2 shows a film reading apparatus employing such efficient processing.

In FIG. 2, reference numeral 103 represents a film to be read, 101 a lamp, and 102 a condenser lens, these elements constituting transmission type illumination means which transmission-illuminates the film 103 through the Köhler's illumination. Reference numeral 104 represents a focusing lens for focusing an image transmitted from the silver salt film 103 onto the surface of photoelectric conversion means in the form of a photoelectric conversion element 105 such as a charge storage type CCD line sensor, area sensor or the like. If a CCD line sensor is used as the photoelectric conversion element 105, the silver salt film 103 or the CCD line sensor is moved by a driver mechanism (not shown) to read the entire area of an image.

Reference numeral 106 represents an amplifier which amplifies an output from the photoelectric conversion element 105 to a predetermined output level. Reference numeral 107 represents a sample/hold circuit which samples and holds the an output signal from the amplifier 106 on the pixel unit basis. Reference numeral 108 represents an A/D converter which converts an output signal from the sample/hold circuit 107 into a digital signal. Reference numeral 109 represents a logarithmic transformer serving as logarithmic conversion means which stores a plurality of logarithmic conversion tables for different reading density ranges and operates to select a conversion table corresponding to one of the curves 41, 42 and 43 shown in FIG. 3 in accordance with a density range select signal, i.e., address signal (digital value) to thereby logarithmically transform the digital signal corresponding to the transmittance T from the A/D converter 108. The logarithmic transformer 109 outputs a final image signal.

The curves 41, 42 and 43 shown in FIG. 3 correspond to the lines 33, 34 and 35 shown in FIG. 1.

The graph shown in FIG. 3 is used for transformation between digital signals. As seen from FIG. 3, the input dynamic range of the curve 41 is narrower than that of the curve 43 so that bits are likely to be missed during signal transformation, resulting in a problem that the quality of a final image may be lowered.

As a means for solving such a problem, there is known a method wherein logarithmic transformation is carried out in an analog fashion by using a logarithmic amplifier or the like prior to the A/D conversion. Although this method solves the above problem of lowering the final image quality, there arises a new problem that the apparatus becomes bulky.

SUMMARY OF THE INVENTION

The present invention has been made in consideration of the above problems. It is an object of the present invention to provide an image reading apparatus capable of properly reading images having a different contrast.

It is another object of the present invention to provide an image reading apparatus capable of reading an image in a proper manner matching a set image density range.

It is a further object of the present invention to provide an image reading apparatus capable of properly reading an image recorded in a film.

The above and other objects and advantages of the present invention will become apparent from the following detailed description when read in conjunction with the accompanying drawings.

DETAILED DESCRIPTION OF THE EMBODIMENTS

The embodiments of this invention will now be described with reference to the accompanying drawings.

Figure 4:
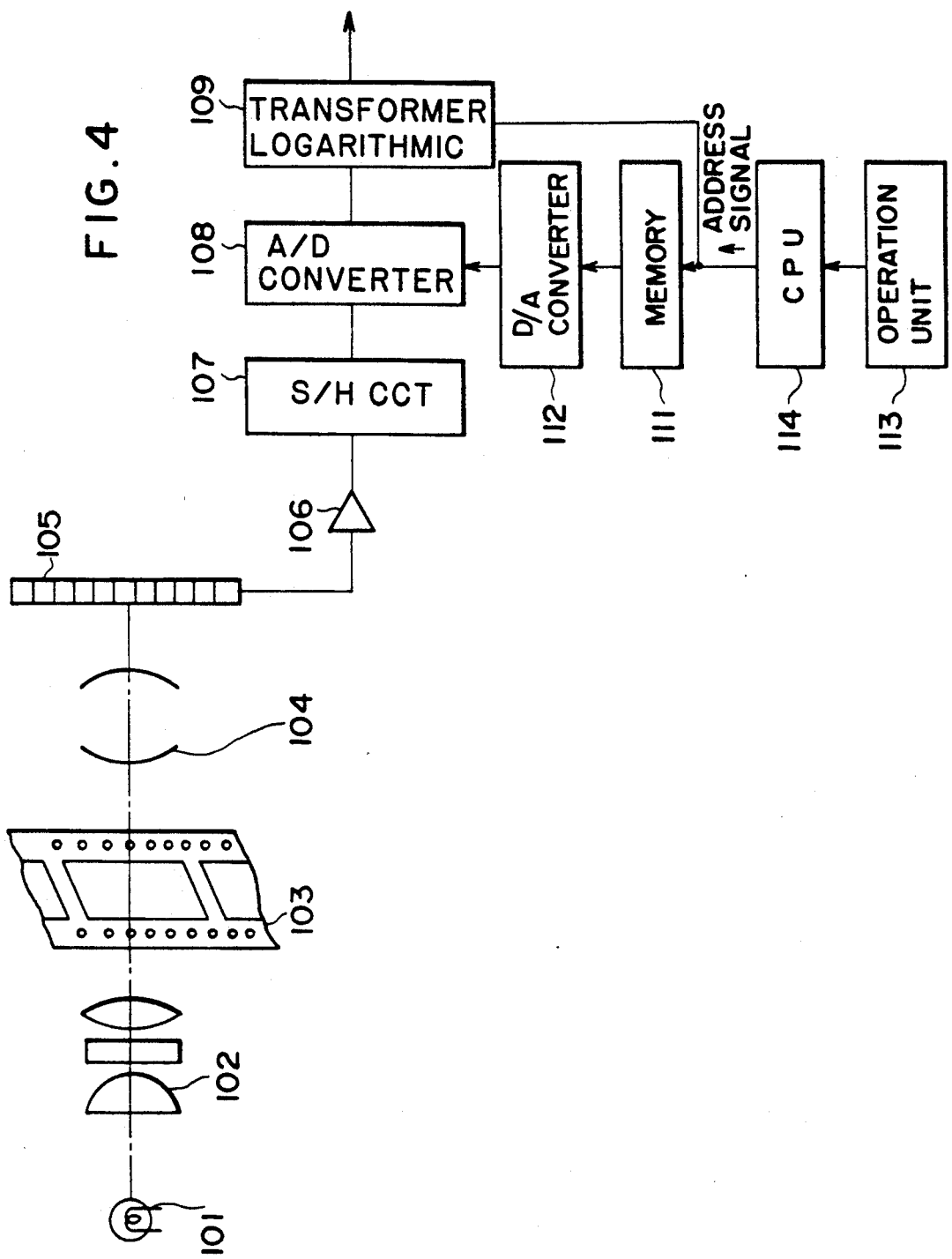
FIG. 4 is a block diagram showing a film reading apparatus according to an embodiment of this invention.

FIG. 4 shows an embodiment of a film reading apparatus embodying the present invention.

Figure 1:
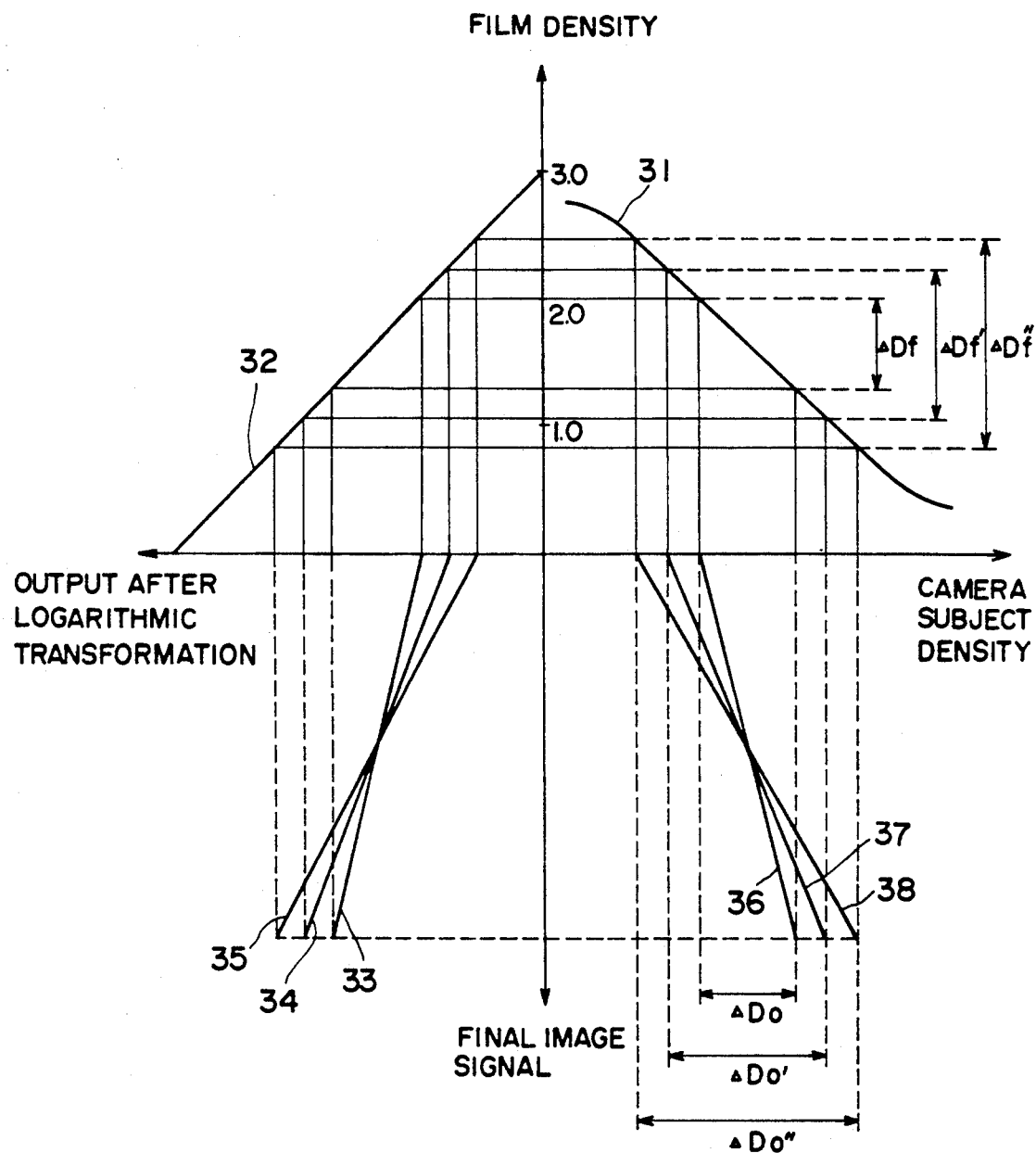
FIG. 1 is a graph illustrating how the density range is variably change.
Figure 2:
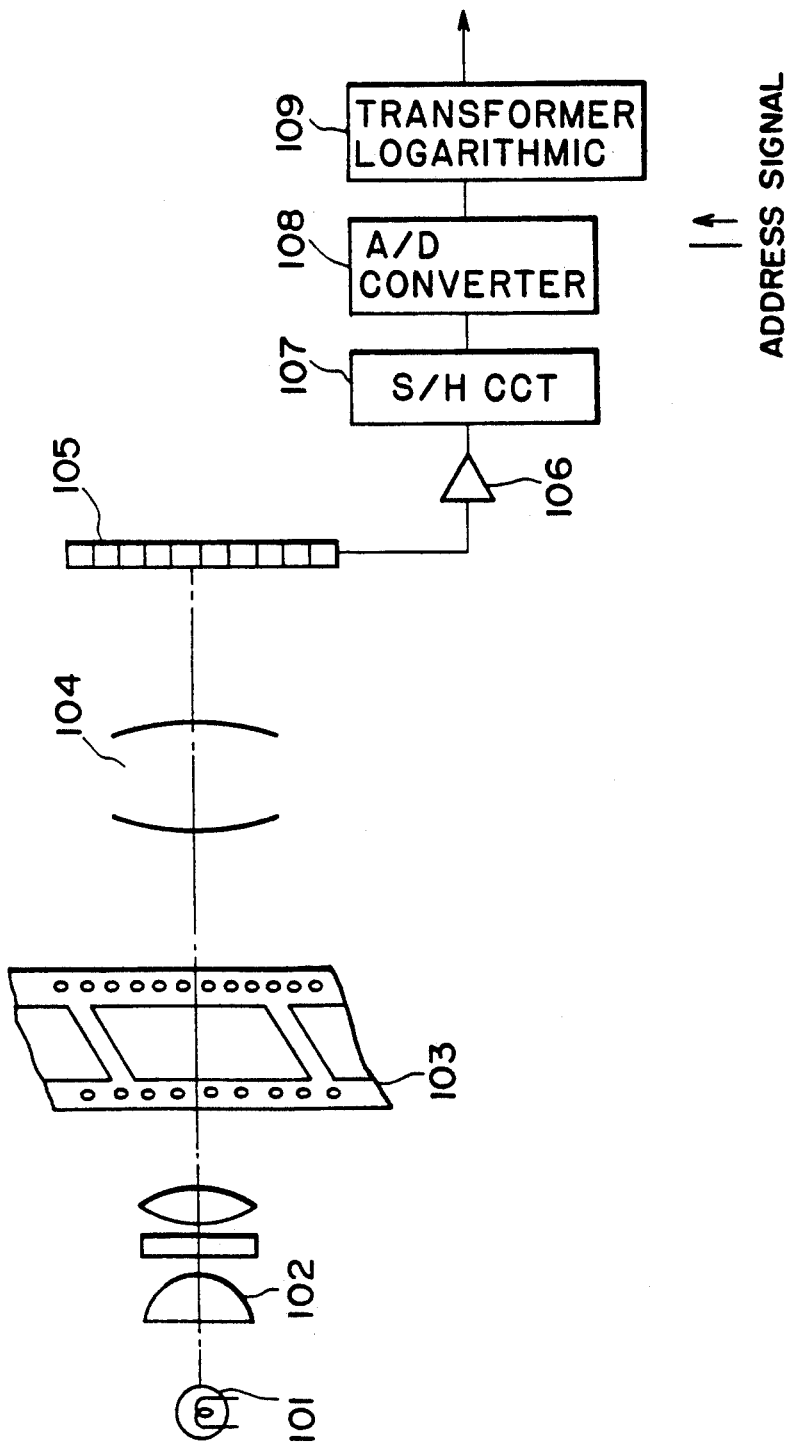
FIG. 2 is a block diagram showing a film reading apparatus.

In FIG. 4, elements 101 to 109 are similar to those shown in FIG. 2. The film 103 is assumed to be a negative film. Reference numeral 113 represents an operation unit which is acted upon by an operator. The operator uses this operation unit to select a contrast of an image to be read which has been recorded in the film. Reference numeral 114 represents a CPU which outputs an address signal indicative of the selected contrast in accordance with the contrast select signal from the operation unit 113.

Reference numeral 111 represents a memory into which look-up tables have been written, the look-up tables being used for outputting an A/D reference value corresponding to the address signal sent from CPU 114. This address signal from CPU 114 is also supplied to a logarithmic transformer 109 to thereby select one of a plurality of logarithmic transformation characteristics prepared beforehand in the logarithmic transformer 109.

Therefore, upon selection of a contrast by the operation unit 113, the logarithmic transformation characteristic of the logarithmic transformer 109 is changed and the reference value for A/D conversion is correspondingly changed.

In the manner as described above, the address signal from CPU 114 is supplied to the memory 111 which stores look-up tables. An output from the memory 111 is passed through D/A converter 112 and converted into an analog signal which is applied to the A/D converter 108 as its reference voltage for A/D conversion. As the reference voltage becomes small, the input signal for A/D conversion is apparently amplified by $(10^{Dfc}/10^{\gamma\Delta D/2})$ times. The memory 111 and D/A converter 112 constitute conversion amount changing means.

Next, referring to FIG. 5, a method of changing the density range will be described.

Specifically, assuming that the camera subject density ranges change among $\Delta D_0$, $\Delta D_0'$ and $\Delta D_0''$ corresponding to the contrasts to be selected by the operation unit 113, the characteristics shown in the third quadrant are changed among straight lines 14, 15 and 16. The characteristics shown in the second quadrant are correspondingly changed among straight lines 11, 12 and 13. The transformation according to the straight lines 14, 15 and 16 is digital signal transformation as conventional. The transformation according to the straight lines 11, 12 and 13, however, can be carried out in an analog fashion prior to A/D conversion. The change of the straight lines 11, 12 and 13 corresponds to parallel motion thereof with respect to logarithmic scale, so that it is no less than multiplication of the film transmittance by a predetermined magnification factor. Specifically, this can be achieved by changing the reference voltage of the A/D converter 108 shown in FIG. 4. This can also be achieved by changing the light amount of the illumination lamp, the amplification factor of the amplifier, or the storage time of CCD.

Next, the method of changing the density range will be detailed with reference to FIG. 6.

Figure 5:
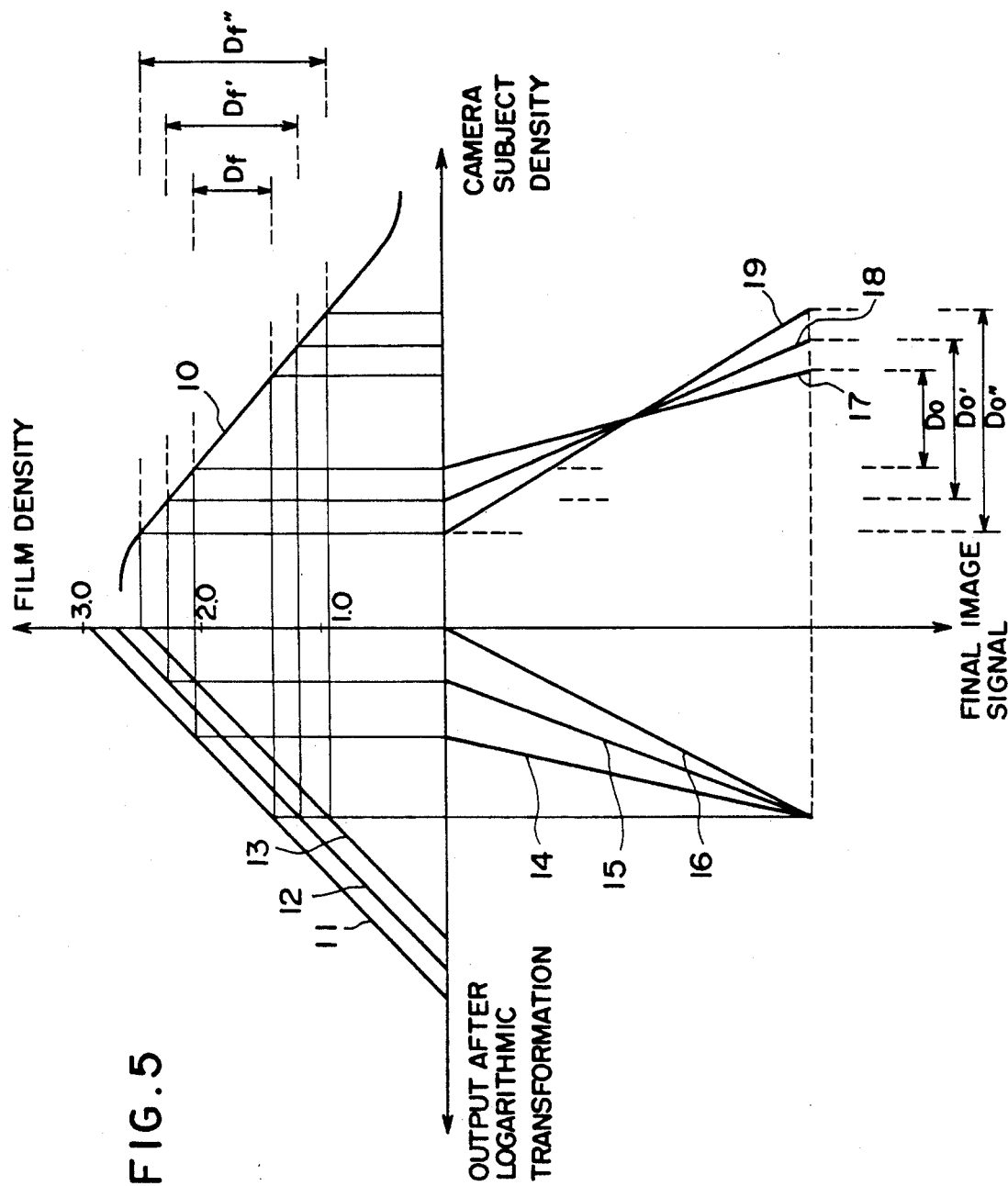
FIG. 5 is a graph illustrating how the density range is variably changed, according to an embodiment of this invention.
Figure 6:
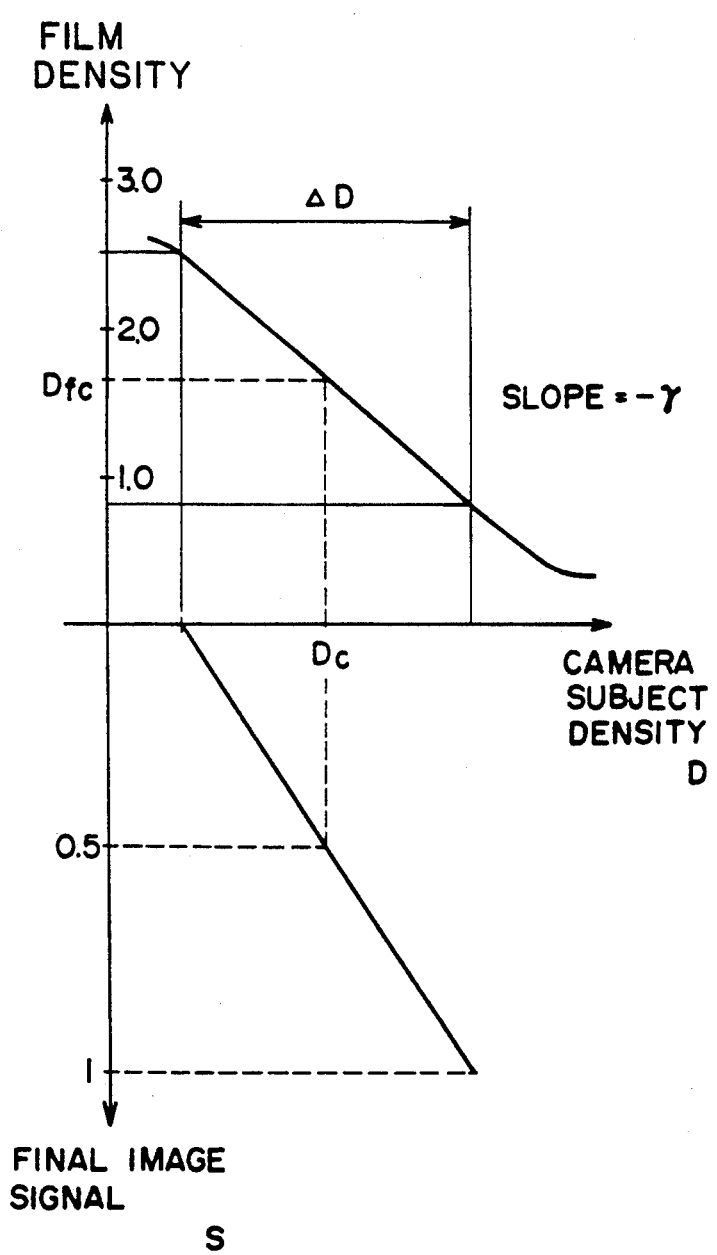
FIG. 6 shows the first and fourth quadrants of the graph shown in FIG. 5.

FIG. 6 illustrates the first and fourth quadrants of the graph shown in FIG. 5. The ordinate of the fourth quadrant is represented by a maximum digital value 1 which corresponds to 255 is an eight bit digital signal is used.

In FIG. 6, the relationship between the subject density D and the film density $D_f$ can be expressed by the following equation (2):

$$D_f = -\gamma(D - D_c) + D_{fc} \qquad (2)$$

where $D_c$ is the center value of the subject density range, and $D_{fc}$ is the film density corresponding to the center value $D_c$.

The final signal value S can be given by the following equation (3) by using the subject density D:

$$S = (1/\Delta D)(D - D_c) + 0.5 \qquad (3)$$

The relationship between the film density $D_f$ and the final output signal S is given by the following equation (4) by deleting D from the equations (2) and (3):

$$S = 0.5 - (1/\gamma\Delta D)(D_f - D_{fc}) \qquad (4)$$

As described previously, since the output from CCD or the like represents not the film density $D_f$ but the film transmittance $T_f$, $D_f = -\log T_f$ is substituted into the equation (4) which is then arranged to obtain the following equation (5):

$$S = 1 - \{-(1/\gamma\Delta D)\log(T_f(10^{Df_c}/10^{\gamma\Delta D/2}))\} \quad (5)$$

The equation (5) means that after amplifying the film transmittance $T_f$ by $(10^{Df_c}/10^{\gamma\Delta D/2})$ times, a logarithmic transformation $y = -(1/\gamma\Delta D) \log x$ is carried out and then reversion of "0" and "1", i.e., reversion of negative and positive is carried out. As described previously, the amplification by $(10^{Df_c}/10^{\gamma\Delta D/2})$ times is carried out in an analog fashion, e.g., by changing the reference voltage of the A/D converter 108, and the logarithmic transformation and negative/positive reversion are carried in a digital fashion by the logarithmic transformer 109 using the logarithmic transformation table. It becomes therefore possible to alleviate bit missing during digital operation as much as possible, independently of the value of $\Delta D$.

Figure 3:
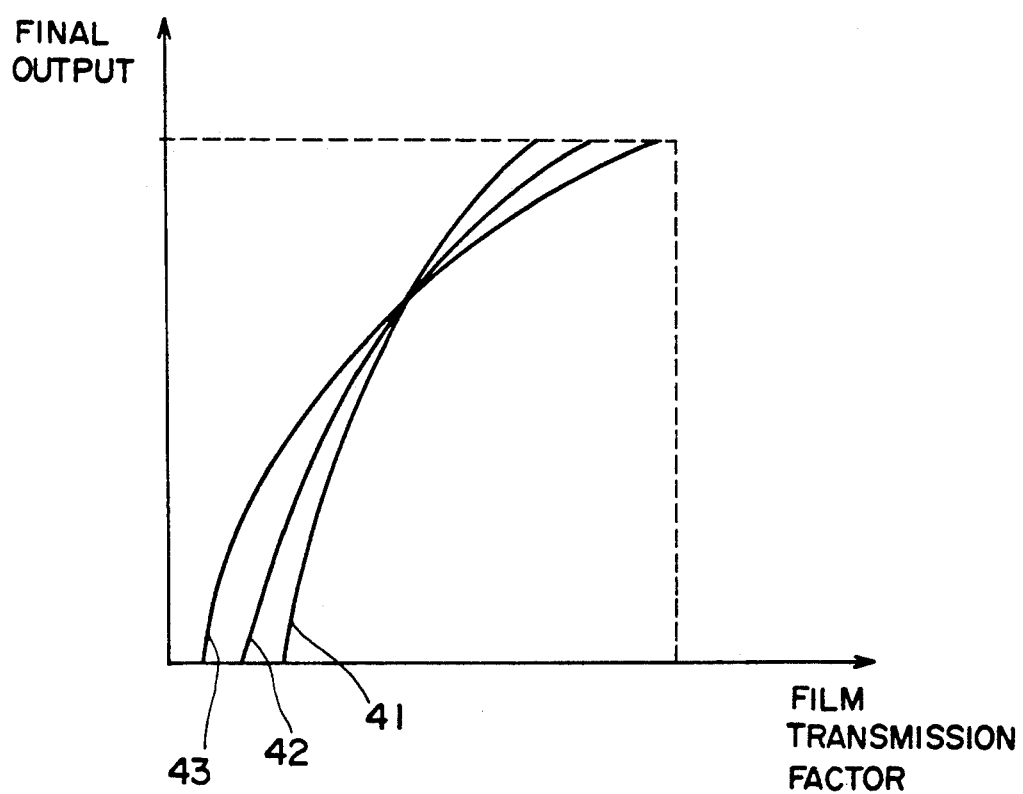
FIG. 3 illustrates an example of gradation transformation tables.
Figure 7:
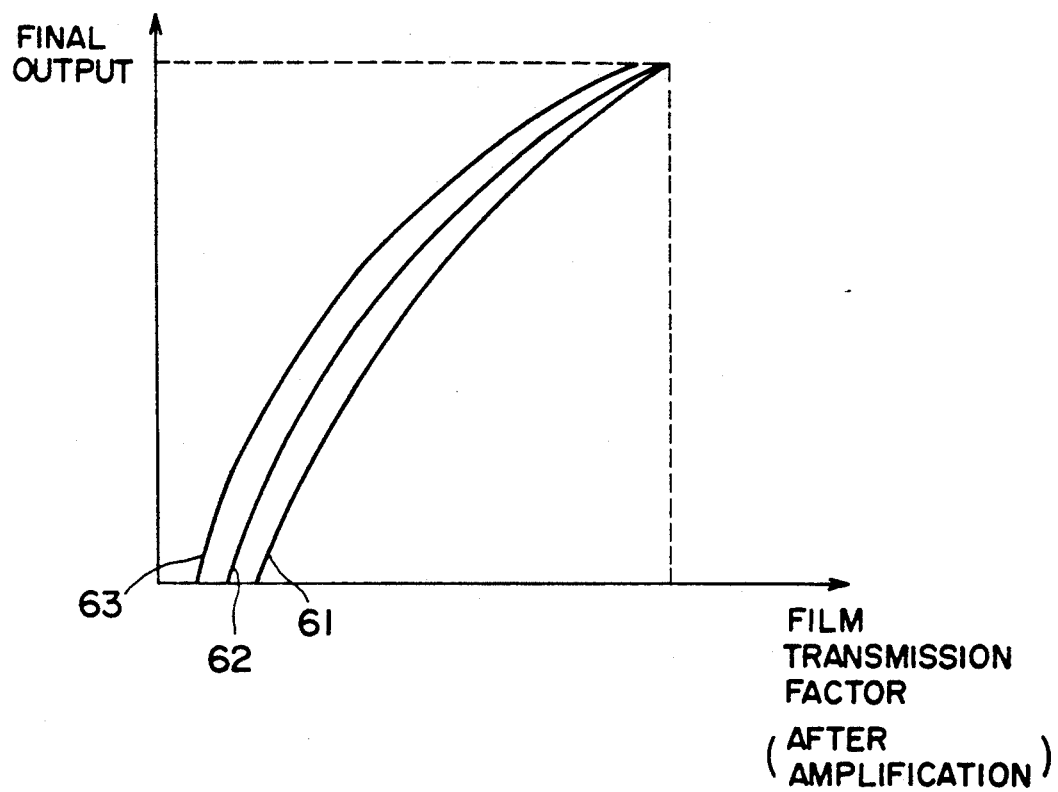
FIG. 7 illustrates an example of gradation transformation tables according to an embodiment of this invention.

FIG. 7 shows the contents of logarithmic transformation tables prepared in the logarithmic transformer 109. The tables have similar contents to those shown in FIG. 3. Curves 61, 62 and 63 correspond to $\Delta D_0$, $\Delta D_0'$ and $\Delta D_0''$. Although bit missing is more or less large for the range $\Delta D_0$, it is considerably improved as compared with FIG. 3.

Figure 8:
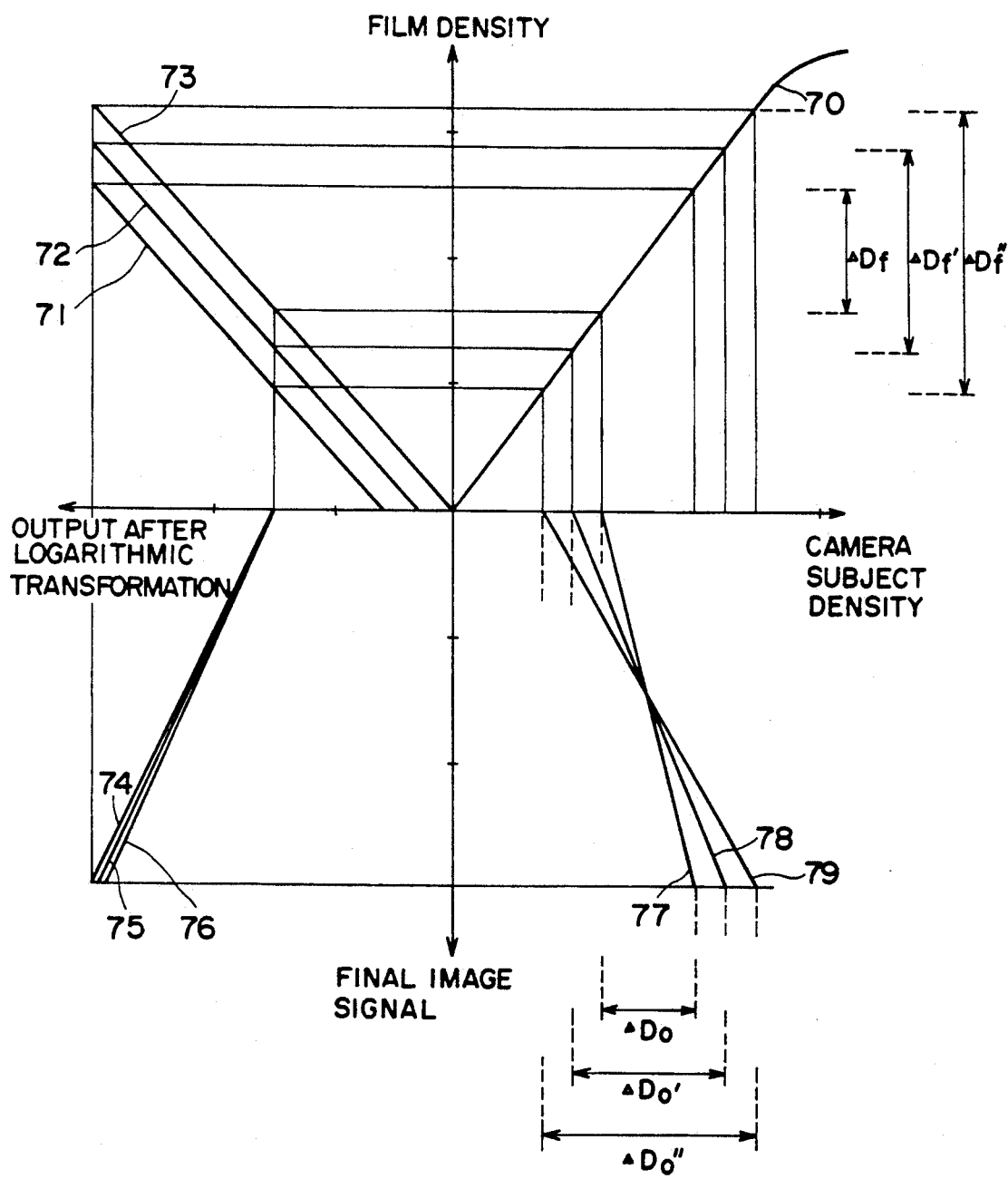
FIG. 8 is a graph illustrating how the density range is variably changed, according to another embodiment of this invention.

In the above embodiment, a negative film has been used by way of example. A reversal film may also be used with similar advantageous effects. Specifically, curves 70 to 79 shown in FIG. 8 correspond to the curves 10 to 19 shown in FIG. 5, and the relationship between the final output signal S and the film transmittance $T_f$ can be expressed by the following equation (6):

$$S = -(1/\Delta\Delta D)\log(T_f(10^{Df_c}/10^{\gamma\Delta D/2})) \quad (6)$$

In accordance with this equation, the transmittance signal $T_f$ is amplified by $(10^{Df_c}/10^{\gamma\Delta D/2})$ and then subjected to logarithmic transformation. In the case of a reversal film, it is not necessary to carry out a process of reversion of negative/positive.

Further, in the above embodiment, the amplification amount at the A/D converter 108 has been controlled in accordance with the selected density range. Instead of this, the light amount of the illumination lamp 101 may be controlled in accordance with the selected density range by using the arrangement in FIG. 9.

Figure 9:
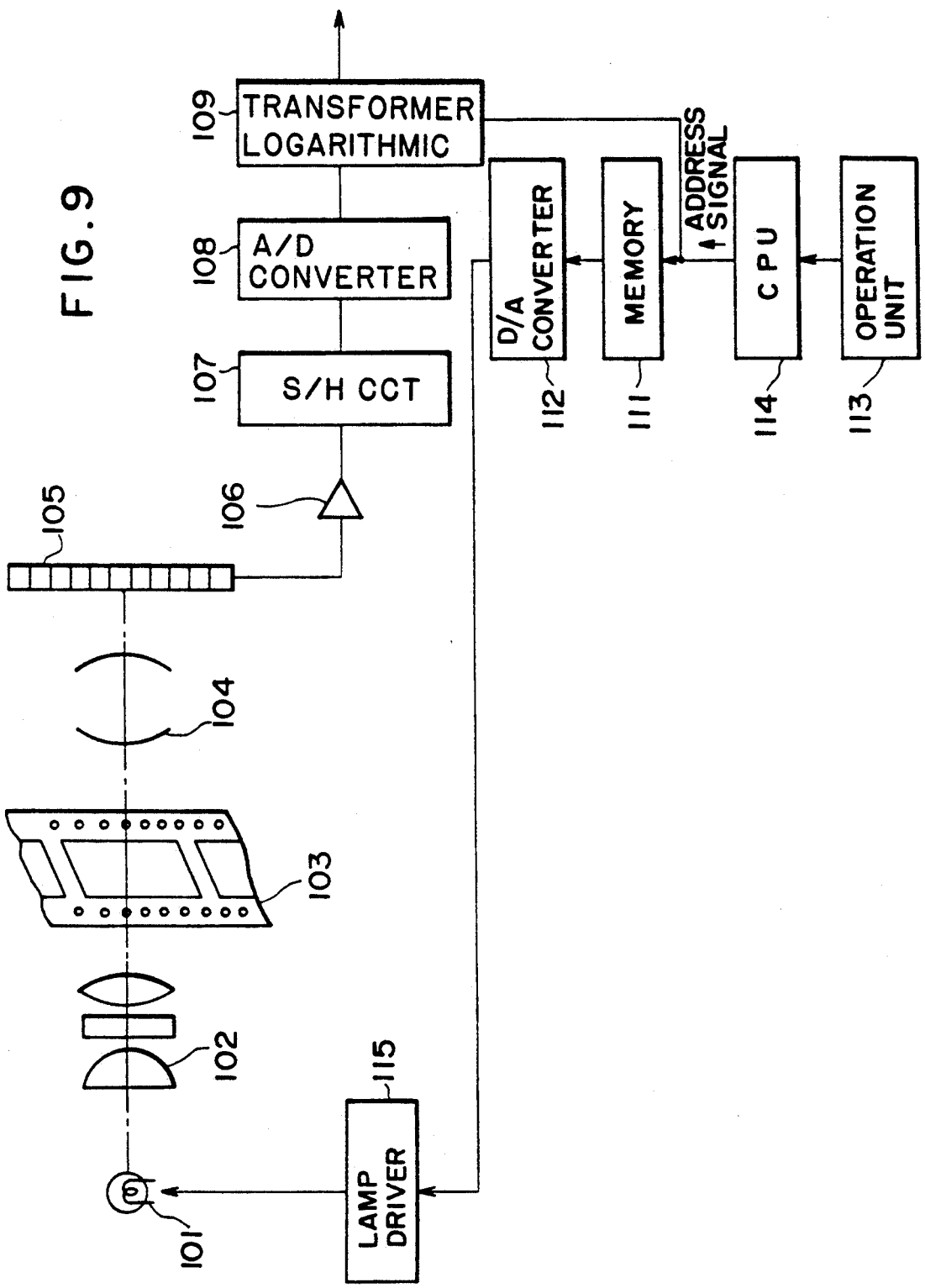
FIGS. 9 to 11 are block diagrams showing the structure of other film reading apparatus.

In FIG. 9, similar elements to those shown in FIG. 4 are represented by using identical reference numerals. The difference from that shown in FIG. 4 is that a lamp driver 115 for the lamp 101 is controlled in accordance with an output from the D/A converter 112 for changing the power to the lamp 101. Namely, the logarithmic transformation is changed in accordance with a contrast selected by the operation unit 113 to correspondingly change the light amount of the lamp 101. It is needless to say that light amount values corresponding to selected contrasts are previously written in the memory 111.

Figure 10:
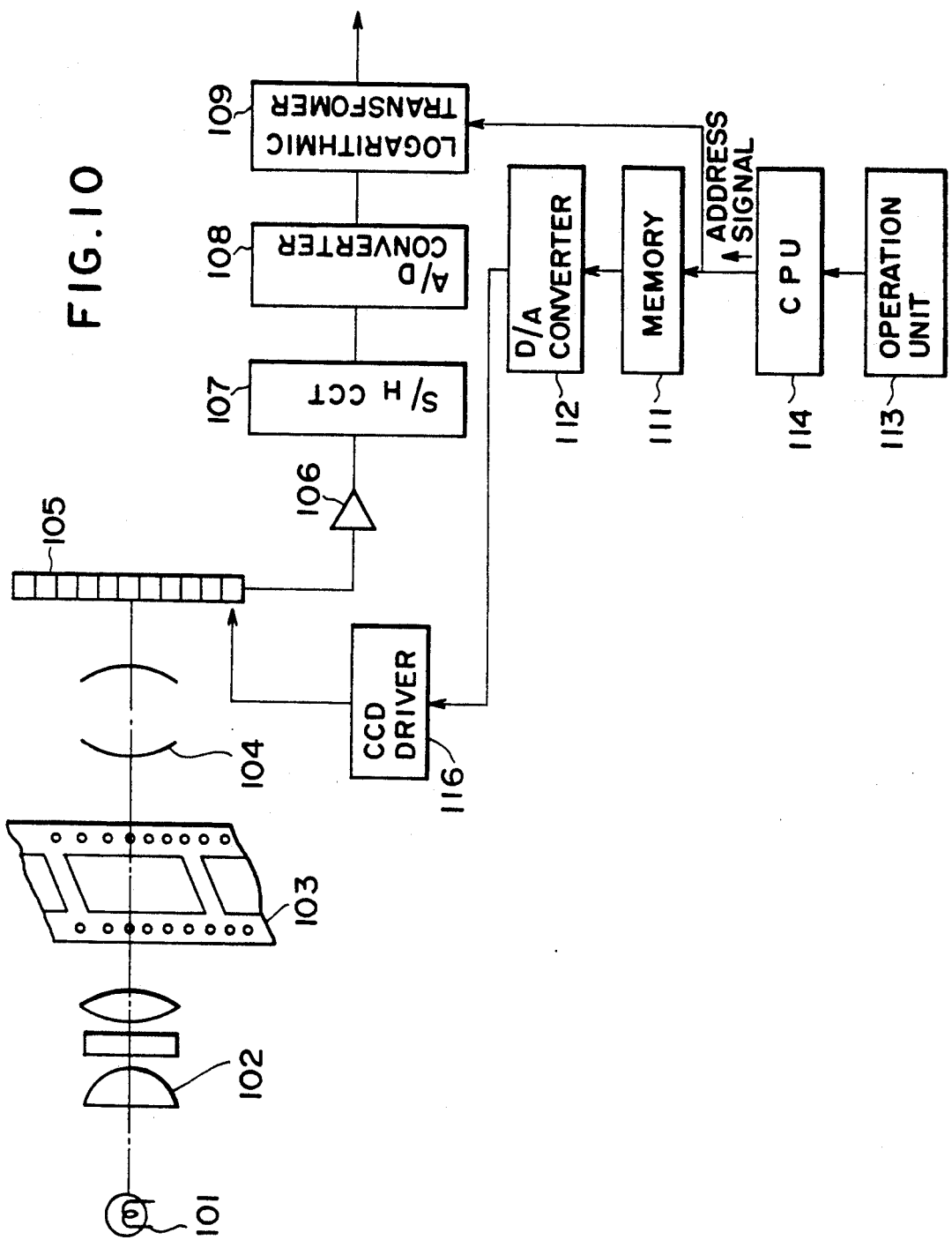

Further, instead of controlling the amplification at the A/D converter 108, the storage time of CCD 105 may be controlled in accordance with a selected density range by using the arrangement shown in FIG. 10.

In FIG. 10, like elements to those shown in FIG. 4 are represented by using identical reference numerals. The difference from that shown in FIG. 4 is that a CCD driver 116 is controlled in accordance with an output from the D/A converter 112 to change the storage time of CCD (photoelectric conversion element) 105. Namely, the logarithmic transformation is changed in accordance with a contrast selected by the operation unit 113 to correspondingly change the storage time of CCD 105. It is needless to say that storage times corresponding to selected contrasts are previously written in the memory 111.

Figure 11:
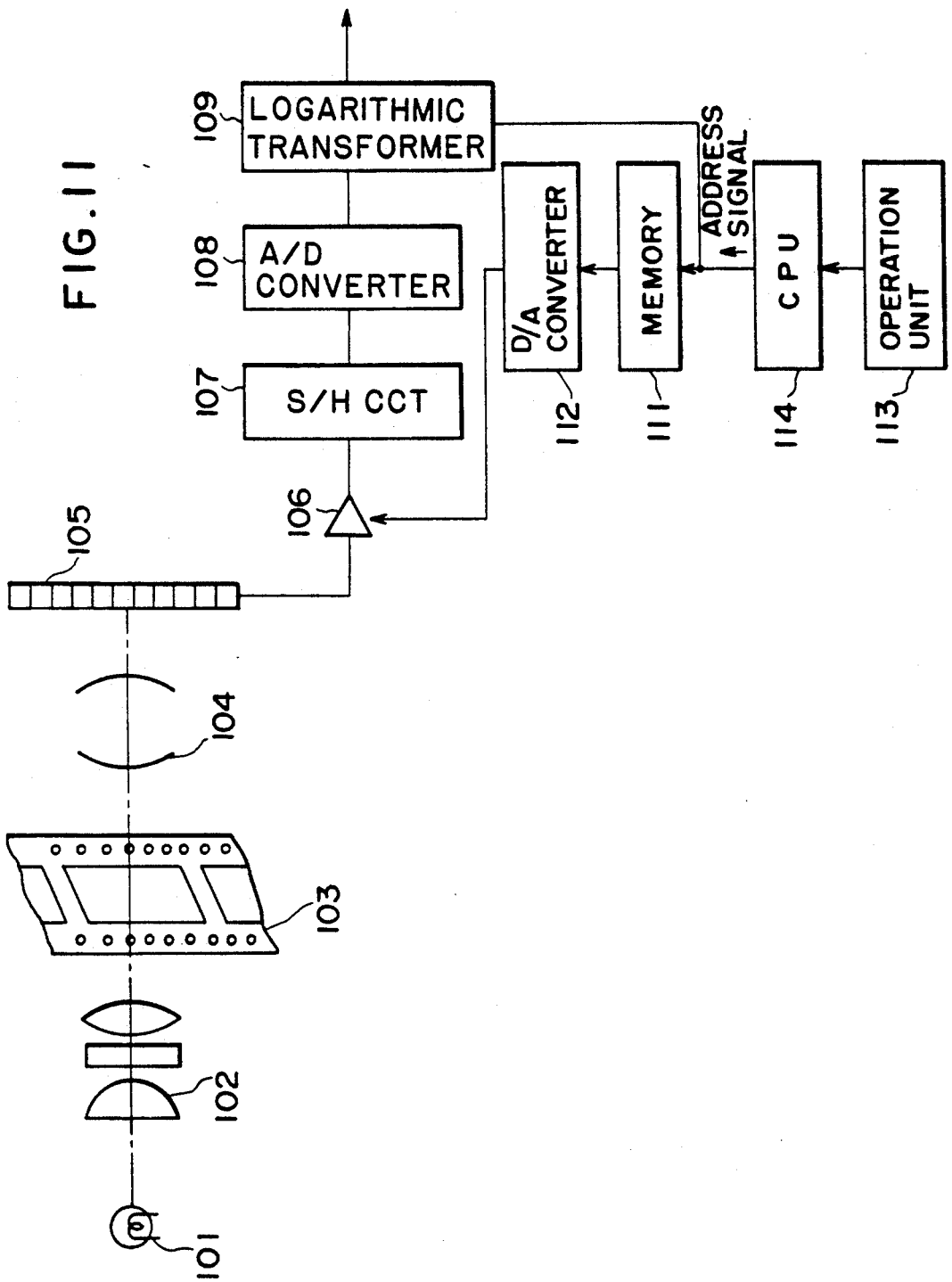

Still further, instead of controlling the amplification at the A/D converter 108, the amplification factor of the amplifier 106 may be controlled in accordance with a selected density range by using the arrangement shown in FIG. 11.

In FIG. 11, like elements to those shown in FIG. 4 are represented by using identical reference numerals. The difference from that shown in FIG. 4 is that the amplification factor of the amplifier 106 is changed with an output from the D/A converter 112. Namely, by previously writing into the memory 111 the data indicative of the amplification factors corresponding to contrasts to be selected by the operation unit 113, the logarithmic transformation is changed in accordance with a contrast selected by the operation unit 113 to correspondingly change the amplification factor.

As described with the embodiments shown in FIGS. 9 to 11, amplification in an analog fashion is possible by changing the light amount of the lamp 101, the storage time of CCD 105, the amplification factor of the amplifier 106, or the like factor, thereby allowing proper processing without bit missing.

In the arrangements shown in FIGS. 9 to 11, an output from the memory 111 is supplied to various elements via the D/A converter 112. Instead of using the D/A converter 112, the digital signal outputted from the memory 111 may be directly supplied to necessary elements for such control operation.

It is also possible to use a combination of two or more arrangements shown in FIG. 4 and FIGS. 9 to 11, thereby achieving finer control operation.

Further, in the above embodiments, the logarithmic transformation characteristic and analog amplification factor (gain) have been controlled in accordance with the contrast information entered from the operation unit 113 by an operator. The invention is not limited thereto. For example, the logarithmic transformation characteristic and analog amplification factor (gain) may be automatically controlled in accordance with the measured density range of a film image, the measurement of the film image being carried out, e.g., by pre-scanning the film image under a predetermined condition and forming a histogram of output values from CCD 105.

As described so far, without making large the apparatus dimension, it is possible to provide a film reading apparatus allowing an improved final image quality.

The present invention has been described in connection with the preferred embodiments. The invention is not limited to such embodiments only, but it is needless to say that various changes and modifications are possible without departing from the scope of appended claims.

I claim:

1. An image reading apparatus comprising:
   light applying means for applying light to an image;
   reading means for photoelectrically reading the image to which light is applied by said light applying means;
   amplifying means for amplifying an analog signal outputted from said reading means;

A/D converting means for converting the analog signal outputted from said amplifying means into a digital signal;

logarithmic transformation means for logarithmically transforming said digital signal outputted from said A/D converting means;

first changing means for changing a logarithmic transformation characteristic of said logarithmic transformation means; and second changing means for changing a property of said digital signal as it is inputted into said logarithmic transformation means, in accordance with a change of the logarithmic transformation characteristic caused by said first changing means, wherein said property is a voltage level.

2. An image reading apparatus according to claim 1, wherein said second changing means changes a reference voltage of said A/D converting means, thereby changing the voltage of said digital signal.

3. An image reading apparatus according to claim 1, wherein said second changing means changes a light amount output by said light applying means.

4. An image reading apparatus according to claim 1, wherein said second changing means changes an amplification factor of said amplifying means.

5. An image reading apparatus according to claim 1, wherein said reading means includes a charge storage type sensor, and said second changing means changes a storage time of said charge storage type sensor.

6. An image reading apparatus according to claim 1, wherein said reading means reads a film to read the image.

7. An image reading apparatus comprising:

illuminating means for illuminating a film;

reading means for photoelectrically reading an image recorded in the film illuminated by said illuminating means;

amplifying means for amplifying an analog signal outputted from said reading means;

converting means for converting the analog signal outputted from said amplifying means into a digital signal;

transformation means for logarithmically transforming the digital signal outputted from said converting means;

first changing means for changing a logarithmic transformation characteristic of said transformation means in accordance with a density range of the image recorded in the film; and second changing means for changing a property of said digital signal as it is inputted into said logarithmic transformation means in accordance with a change of the logarithmic transformation characteristic caused by said first changing means, wherein said property is a voltage level.

8. An image reading apparatus according to claim 7, wherein said second changing means changes a reference voltage of said converting means, thereby changing the voltage of said digital signal.

9. An image reading apparatus according to claim 7, wherein said second changing means changes a light amount output by said illuminating means.

10. An image reading apparatus according to claim 7, wherein said second changing means changes an amplification factor of said amplifying means.

11. An image reading apparatus according to claim 7, wherein said reading means includes a charge storage type sensor, and said second changing means changes a storage tine of said charge storage type sensor.

12. An image reading apparatus comprising:

light applying means for applying light to an image;

reading means for photoelectrically reading the image to which light is applied by said light applying means;

amplifying means for amplifying an analog signal outputted from said reading means;

A/D converting means for converting the analog signal outputted from said amplifying means into a digital signal;

logarithmic transformation means for logarithmically transforming said digital signal outputted from said A/D converting means;

first changing means for changing a logarithmic transformation characteristic of said logarithmic transformation means; and second changing means for changing a property of said digital signal as it is inputted into said logarithmic transformation means, in accordance with a change of the logarithmic transformation characteristic caused by said first changing means, wherein said second changing means changes an amplification factor of said amplifying means.

13. An image reading apparatus comprising:

light applying means for applying light to an image;

reading means for photoelectrically reading the image to which light is applied by said light applying means;

amplifying means for amplifying an analog signal outputted from said reading means;

A/D converting means for converting the analog signal outputted from said amplifying means into a digital signal;

logarithmic transformation means for logarithmically transforming said digital signal outputted from said A/D converting means;

first changing means for changing a logarithmic transformation characteristic of said logarithmic transformation means; and second changing means for changing a property of said digital signal as it is inputted into said logarithmic transformation means, in accordance with a change of the logarithmic transformation characteristic caused by said first changing means, wherein said reading means includes a charge storage type sensor, and said second changing means changes a storage time of said charge storage type sensor.

14. An image reading apparatus comprising:

illuminating means for illuminating a film;

reading means for photoelectrically reading an image recorded in the film illuminated by said illuminating means;

amplifying means for amplifying an analog signal outputted from said reading means;

converting means for converting the analog signal outputted from said amplifying means into a digital signal;

transformation means for logarithmically transforming the digital signal outputted from said converting means;

first changing means for changing a logarithmic transformation characteristic of said transformation means in accordance with a density range of the image recorded in the film; and second changing means for changing a property of said digital signal as it is inputted into said logarithmic transformation means in accordance with a change of the logarithmic transformation characteristic caused by said first changing means, wherein said second changing means changes an amplification factor of said amplifying means.

15. An image reading apparatus comprising:
illuminating means for illuminating a film;
reading means for photoelectrically reading an image recorded in the film illuminated by said illuminating means;
amplifying means for amplifying an analog signal outputted from said reading means;
converting means for converting the analog signal outputted from said amplifying means into a digital signal;
transformation means for logarithmically transforming the digital signal outputted from said converting means;
first changing means for changing a logarithmic transformation characteristic of said transformation means in accordance with a density range of the image recorded in the film; and
second changing means for changing a property of said digital signal as it is inputted into said logarithmic transformation means in accordance with a change of the logarithmic transformation characteristic caused by said first changing means, wherein said reading means includes a charge storage type sensor, and said second changing means changes a storage time of said charge storage type sensor.

16. An image reading apparatus comprising:
light applying means for applying light to an image;
reading means for photoelectrically reading the image to which light is applied by said light applying means;
amplifying means for amplifying an analog signal outputted from said reading means;
A/D converting means for converting the analog signal outputted from said amplifying means into a digital signal;
logarithmic transformation means for logarithmically transforming said digital signal outputted from said A/D converting means;
first changing means for changing a logarithmic transformation characteristic of said logarithmic transformation means; and
second changing means for changing a voltage level of said digital signal as it is inputted into said logarithmic transformation means, in accordance with a change of the logarithmic transformation characteristic caused by said first changing means, wherein said second changing means changes the voltage level by controlling at least one of said light applying means, said reading means, said amplifying means and said A/D converting means.

17. An image reading apparatus according to claim 16, wherein said second changing means changes the voltage level of the digital signal by controlling a reference voltage of said A/D converting means.

18. An image reading apparatus according to claim 16, wherein said second changing means changes the voltage level of the digital signal by controlling a light amount output by said light applying means.

19. An image reading apparatus according to claim 16, wherein said second changing means changes the voltage level of the digital signal by controlling an amplification factor of said amplifying means.

20. An image reading apparatus according to claim 16, wherein said reading means includes a charge storage type sensor and said second changing means changes the voltage level of the digital signal by controlling a storage time of said charge storage type sensor.

21. An image reading apparatus according to claim 16, wherein said reading means reads a film to read the image.

22. An image reading method comprising the steps of:
applying light to an image;
photoelectrically reading the image to which light is applied;
amplifying an analog signal outputting in said reading step;
converting the amplified analog signal into a digital signal;
logarithmically transforming the digital signal to output a resultant signal as an image data signal;
changing a logarithmic transformation characteristic used in said logarithmic transforming step, in accordance with the image to be read; and
changing a property of the digital signal to be logarithmically transformed, in accordance with a change of the logarithmic transforming characteristic.

23. A method according to claim 22, wherein the property of the digital signal to be logarithmically transformed is changed by changing a reference voltage used in converting the analog signal into the digital signal.

24. A method according to claim 22, wherein the property of the digital signal to be logarithmically transformed is changed by changing an amount of light applied to the image.

25. A method according to claim 22, wherein the property of the digital signal to be logarithmically transformed is changed by changing an amplification factor of the analog signal outputted in said reading step.

26. A method according to claim 22, wherein the property of the digital signal to be logarithmically transformed is changed by changing a charge storage time in said photoelectric reading step.

* * * * *

UNITED STATES PATENT AND TRADEMARK OFFICE
CERTIFICATE OF CORRECTION

PATENT NO. : 5,185,668

DATED : February 9, 1993

INVENTOR(S) : KENICHI OHTA

It is certified that error appears in the above-identified patent and that said Letters Patent is hereby corrected as shown below:

SHEET 10 OF 11

FIG. 10, "TRANSFOMER" should read --TRANSFORMER--.

COLUMN 2

Line 39, "the an" should read --an--.

COLUMN 3

Line 22, "change;" should read --changed;--.

COLUMN 4

Line 45, "is" should read --if--.

COLUMN 5

Line 35, "$(1/\Delta\Delta D)\log$" should read --$(1/\gamma\Delta D)\log$--.

COLUMN 6

Line 59, "appended" should read --the appended--.

UNITED STATES PATENT AND TRADEMARK OFFICE
CERTIFICATE OF CORRECTION

PATENT NO. : 5,185,668
DATED : February 9, 1993
INVENTOR(S) : KENICHI OHTA

It is certified that error appears in the above-identified patent and that said Letters Patent is hereby corrected as shown below:

<u>COLUMN 8</u>

Line 2, "tine" should read --time--.

Signed and Sealed this

Twelfth Day of April, 1994

Attest:

BRUCE LEHMAN

*Attesting Officer*    *Commissioner of Patents and Trademarks*